US012387252B2

(12) United States Patent
Andronic et al.

(10) Patent No.: US 12,387,252 B2
(45) Date of Patent: Aug. 12, 2025

(54) SELF-CHECKOUT STORE

(71) Applicant: Bizerba SE & Co. KG, Balingen (DE)

(72) Inventors: Tudor Andronic, Matzingen (CH);
Meik Huber, Muehlheim (DE)

(73) Assignee: BIZERBA SE & CO. KG, Balingen (DE)

( * ) Notice: Subject to any disclaimer, the term of this patent is extended or adjusted under 35 U.S.C. 154(b) by 0 days.

(21) Appl. No.: 17/551,235

(22) Filed: Dec. 15, 2021

(65) Prior Publication Data
US 2022/0207595 A1     Jun. 30, 2022

(30) Foreign Application Priority Data
Dec. 27, 2020   (EP) .................................... 20217326

(51) Int. Cl.
*G06Q 30/0601* (2023.01)
*G06Q 20/18* (2012.01)
*G06Q 20/20* (2012.01)

(52) U.S. Cl.
CPC ......... *G06Q 30/0637* (2013.01); *G06Q 20/18* (2013.01); *G06Q 20/208* (2013.01)

(58) Field of Classification Search
CPC .. G06Q 30/0637; G06Q 20/18; G06Q 20/208; A47F 9/048; G01G 19/4144; G07G 1/0072; G07G 1/14
See application file for complete search history.

(56) References Cited

U.S. PATENT DOCUMENTS 7,780,081 B1 * 8/2010 Liang ................. G06Q 30/0633
235/383
10,520,353 B1 * 12/2019 Shi ......................... G01G 19/52
(Continued)

FOREIGN PATENT DOCUMENTS

EP      1717772 A1    11/2006
EP      3654305 A1     5/2020
(Continued)

OTHER PUBLICATIONS

Clearing shopping cart after checkout (Jun. 19, 2019). Stackoverflow, retrieved by the examiner on Sep. 10, 2024 from https://stackoverflow.com/questions/56671669/clearing-shopping-cart-after-checkout (hereinafter referred to as "Stackoverflow"). (Year: 2019).*
(Continued)

*Primary Examiner* — Peter Ludwig
(74) *Attorney, Agent, or Firm* — LEYDIG, VOIT & MAYER, LTD.

(57) ABSTRACT

A method operates a sales device for goods. The method includes: detecting, using a shelf with automatic removal monitoring, a removed item and determining item data of the removed item; receiving the item data of the removed item; adding the item data of the removed item to a list of items intended for payment; receiving an item number from a product scanner; adding the item associated with the item number to a list associated with the product scanner; identifying the product scanner at the sales device; collecting, with at least one sensor, data about items in a shopping cart or a shopping basket which is located on a support plate of the sales device; and validating the list of items associated with the product scanner on the basis of the data from the at least one sensor and the list of items intended for payment.

12 Claims, 7 Drawing Sheets

(56) References Cited

U.S. PATENT DOCUMENTS

| | | | |
|---|---|---|---|
| 10,540,700 B1* | 1/2020 | Chilukuri | H04W 4/029 |
| 10,607,080 B1* | 3/2020 | Mirza | G06Q 30/0633 |
| 10,607,116 B1* | 3/2020 | Omer | G06Q 10/06393 |
| 11,023,728 B1* | 6/2021 | Wang | H04N 21/47217 |
| 11,042,836 B1* | 6/2021 | Goldstein | G06Q 10/087 |
| 11,049,170 B1 | 6/2021 | Francis et al. | |
| 11,068,962 B1 | 7/2021 | Grigsby et al. | |
| 11,132,737 B2* | 9/2021 | Glaser | G06Q 30/0641 |
| 11,195,140 B1 | 12/2021 | Munger et al. | |
| 11,301,984 B1 | 4/2022 | Kumar et al. | |
| 11,443,275 B1 | 9/2022 | Prakash et al. | |
| 11,636,457 B1* | 4/2023 | De Bonet | G06Q 20/204 |
| | | | 705/23 |
| 2012/0284132 A1* | 11/2012 | Kim | G06Q 20/18 |
| | | | 235/375 |
| 2013/0284806 A1 | 10/2013 | Margalit | |
| 2014/0052555 A1* | 2/2014 | MacIntosh | G06V 20/10 |
| | | | 705/23 |
| 2015/0039458 A1* | 2/2015 | Reid | A61B 5/117 |
| | | | 705/26.1 |
| 2015/0127496 A1* | 5/2015 | Marathe | G06Q 10/087 |
| | | | 705/28 |
| 2016/0189277 A1* | 6/2016 | Davis | H04N 7/181 |
| | | | 705/26.8 |
| 2017/0083887 A1* | 3/2017 | Volta | G06Q 20/203 |
| 2017/0158215 A1 | 6/2017 | Phillips et al. | |
| 2017/0169440 A1 | 6/2017 | Dey et al. | |
| 2018/0096566 A1 | 4/2018 | Blair, II et al. | |
| 2018/0114184 A1* | 4/2018 | Brooks | G01G 23/18 |
| 2018/0232796 A1* | 8/2018 | Glaser | G06Q 40/12 |
| 2018/0240180 A1 | 8/2018 | Glaser et al. | |
| 2018/0373928 A1 | 12/2018 | Glaser et al. | |
| 2019/0026593 A1 | 1/2019 | Sawada | |
| 2019/0108396 A1* | 4/2019 | Dal Mutto | G06F 18/24 |
| 2019/0147709 A1 | 5/2019 | Schoner | |
| 2019/0164142 A1 | 5/2019 | Scott et al. | |
| 2019/0236583 A1 | 8/2019 | Hagen et al. | |
| 2019/0325367 A1 | 10/2019 | Tovey et al. | |
| 2020/0034812 A1* | 1/2020 | Nemati | G06Q 20/14 |
| 2020/0151696 A1 | 5/2020 | Plocher | |
| 2020/0286058 A1 | 9/2020 | Edwards et al. | |
| 2020/0402139 A1 | 12/2020 | Higa et al. | |
| 2021/0035084 A1* | 2/2021 | Afraite-Seugnet | G06Q 20/204 |
| 2021/0182922 A1* | 6/2021 | Zheng | H04N 23/69 |
| 2021/0196059 A1 | 7/2021 | Fritsch et al. | |
| 2021/0342807 A1* | 11/2021 | Meidar | G06Q 20/203 |
| 2021/0407131 A1 | 12/2021 | Kallakuri et al. | |
| 2022/0067644 A1 | 3/2022 | Drissner | |
| 2022/0067689 A1 | 3/2022 | Guack et al. | |
| 2022/0114868 A1* | 4/2022 | Bronicki | G06Q 20/40145 |
| 2022/0198550 A1* | 6/2022 | Meidar | G06Q 20/20 |

FOREIGN PATENT DOCUMENTS

| | | |
|---|---|---|
| EP | 3620760 A1 | 11/2020 |
| EP | 3845874 A1 | 7/2021 |

OTHER PUBLICATIONS

U.S. Appl. No. 17/557,078, filed Dec. 21, 2021.
U.S. Appl. No. 17/551,207, filed Dec. 15, 2021.
Wankhede, Kirti, Bharati Wukkadada, and Vidhya Nadar. "Just walk-out technology and its challenges: A case of Amazon Go." 2018 International Conference on Inventive Research in Computing Applications (ICIRCA). IEEE, 2018. (Year: 2018).
Chi, Hong-Chuan, et al. "Smart self-checkout carts based on deep learning for shopping activity recognition." 2020 21st Asia-Pacific Network Operations and Management Symposium (APNOMS). IEEE, 2020. (Year: 2020).

* cited by examiner

SELF-CHECKOUT STORE

CROSS REFERENCE TO RELATED APPLICATIONS

This application claims benefit to European Patent Application No. EP 20217326.6, filed on Dec. 27, 2020, which is hereby incorporated by reference herein.

FIELD

The present invention relates to a method for operating a sales device for goods, in particular retail goods, and to a sales device for self-checkout of goods, in particular retail goods.

BACKGROUND

A device for operator-free sale—in particular, for operator-free billing in supermarkets—is discussed in EP 1717772 A1, for example. It offers a system in which the customer places products in a shopping cart in the supermarket as usual. When walking through the supermarket, the customer scans each product that they place into the shopping cart. At the checkout, the information about the scanned products is transmitted from the scanner to a billing terminal. The customer can then pay their purchase. In order to be able to indicate errors in the scanning process, different validation methods are provided at the checkout, e.g., based on optical methods or weight detection methods. In the event of deviations between the items in the shopping cart and the scanned items, this must be corrected at checkout.

Shelving systems with integrated inventory monitoring are discussed in EP 3620760 B1. A previously unpublished European patent application EP 19220148.1 of the applicant shows a further variant of a shelving system with integrated inventory monitoring. Goods are offered to a customer for removal on a support surface. A weight determination is used to determine from which position a product was removed from the support surface. Inventory monitoring is continuously updated with the information about the removed goods.

SUMMARY

In an embodiment, the present disclosure provides a method for operating a sales device for goods. The method includes: detecting, using a shelf with automatic removal monitoring, a removed item and determining item data of the removed item; receiving, by a controller, the item data of the removed item; adding, with the controller, the item data of the removed item to a list of items intended for payment; receiving, by the controller, an item number from a product scanner; adding, with the controller, the item associated with the item number to a list associated with the product scanner; identifying the product scanner at the sales device; collecting, with at least one sensor, data about items in a shopping cart or a shopping basket which is located on a support plate of the sales device; and validating the list of items associated with the product scanner on the basis of the data from the at least one sensor and the list of items intended for payment.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

Figure 1:
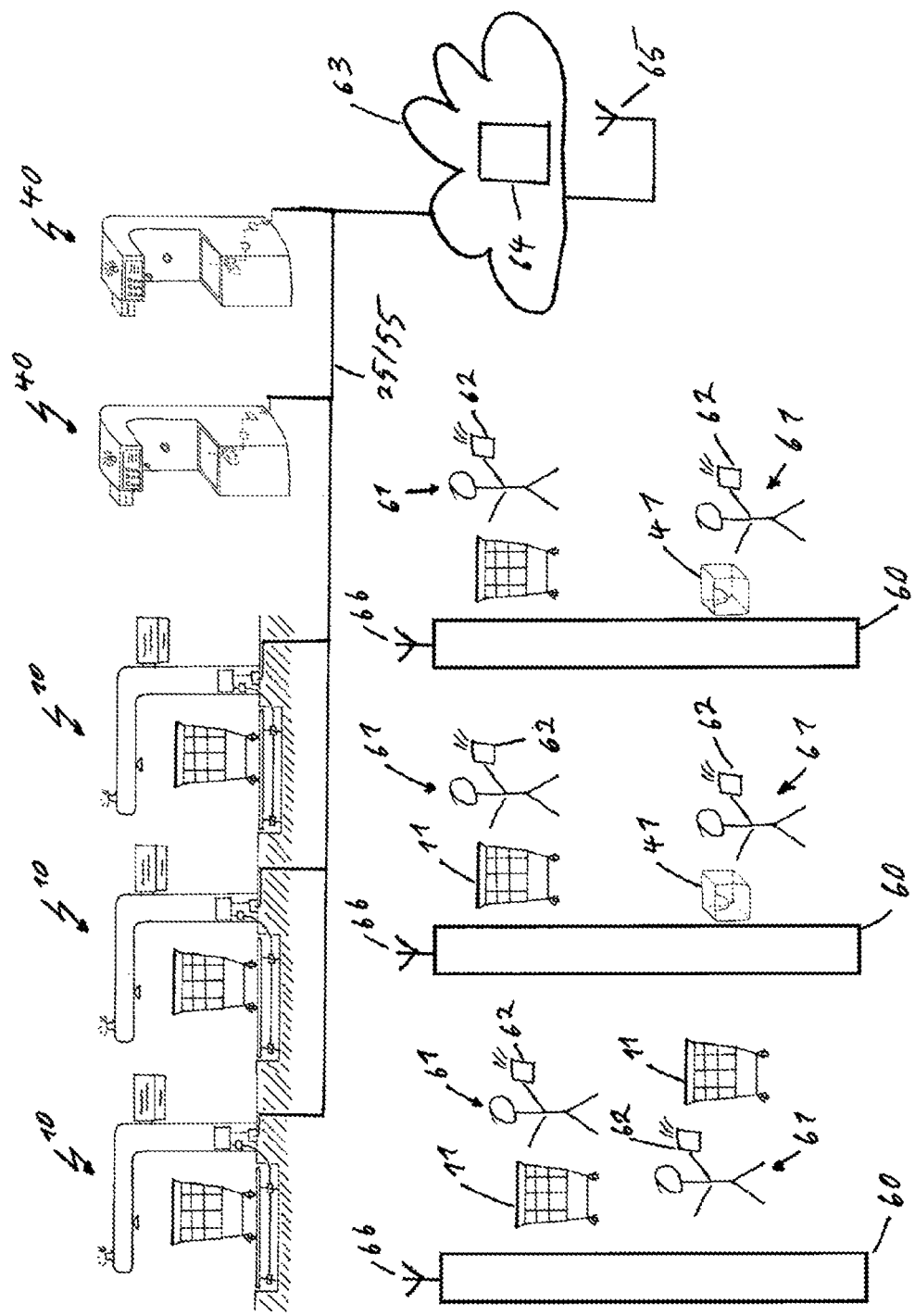
FIG. 1 a system for self-checkout in a store.

Aspects of the present disclosure provide a method for operating a sales device for goods and an associated sales device for self-checkout, the method being less prone to errors and having an optimized validation method.

According to one or more embodiments the invention, a method for operating a sales device for goods is provided. These may be, in particular retail, goods. The method includes:

Detecting a removed item and determining its item data. This step is carried out by a shelf with automatic removal monitoring. In this context, automatic removal monitoring means that the shelf is designed in such a way that the removal of an item can be detected. In this context, automatic removal monitoring is not to be understood as meaning that the shelf or an inventory management system connected to the shelf necessarily has to know or calculate the current inventory on the shelf. In one embodiment, it is a shelf with integrated inventory monitoring, the functionality for detecting goods for inventory monitoring of which is simultaneously used as removal monitoring for the method for operating the sales device. In one embodiment, a removed item is detected with a camera or with an optical sensor. In one embodiment, a removed item is detected using weight sensors.

Receiving the item data of the removed item. These item data are received by a control device (controller).

Adding the item data of the removed item to a list of items intended for payment. This step is carried out with the control device. The list of items intended for payment comprises items that have already been removed from the shelves, but have not yet been paid. This list is continuously updated by the control device.

Receiving an item number from a product scanner. The item number is received by the control device. The product scanner determines the item number, for example, by a customer scanning a barcode of an item if they remove the item from the shelf and places it in their shopping cart or shopping basket. In one embodiment, the product scanner is a smartphone on which there is a corresponding app for scanning the item. This app then sends the item number via a network from which the sales device receives the item number.

Adding the item associated with the item number to a list associated with the product scanner. This step is executed in the control device. In one embodiment, a list is maintained and continuously updated in the control device for each product scanner, indicating all items that have been scanned by the product scanner. These are the items that were placed in the shopping cart or shopping basket by the customer during this purchase and that still have to be paid for. In one embodiment, the items on the list of items intended for payment are provided with a parameter in order to assign them to a corresponding product scanner.

Identifying the product scanner at said sales device. In one embodiment, this step is carried out by scanning a quick response (QR) code of a sales device with the product scanner and the product scanner sends to the control device information as to which sales device it has been connected to. Identifying the product scanner at the sales device is performed in an indirect way in this step. This is also to be understood as identifying the product scanner at the sales device.

Collecting data about items in a shopping cart or a shopping basket which is located on a support plate of the sales device. At least one sensor is used for this purpose.

Validating the list of items associated with the product scanner based on the data from the at least one sensor and the list of items intended for payment. The validation step is carried out in an evaluation device. In particular, this means that the data of the sensor are compared to the list of items associated with the product scanner. If discrepancies are detected based on the data from the sensor, the items are not validated. In order to facilitate the detection of the items based on the data from the sensor and to make it more process-safe, the evaluation device uses the list of items intended for payment as a basis. The reason for this is that only items that are on the list of items intended for payment and thus have been removed from a shelf are eligible for a payment transaction. Thus, no items other than these can have been detected by the sensor.

The person skilled in the art understands that the evaluation device is not necessarily a single module or component. For example, parts of the evaluation device may be accommodated in a sales device and other parts of the evaluation device may be accommodated, for example, in a network or a computing cloud. Rather, the evaluation device is to be understood as a cooperating system consisting of a plurality of individual and, where applicable, distributed parts.

In one embodiment, in the event that items could not be validated in the validation step, the method includes:

Displaying on an input/output unit of the sales device at least a part of the list of the items intended for payment.

Receiving further items intended for a payment transaction via those of the input/output unit. This means that a customer has the option of entering or selecting further items via the input/output unit. These items are received by the sales device through an interaction with the customer. In one embodiment, the input/output unit for the step of displaying and/or receiving is a touchscreen of a smartphone on which a corresponding app is running. In one embodiment, the smartphone is also the product scanner.

In one embodiment, when displaying at least a part of the list of the items intended for payment, only the items or a part of the items that are not on one of the lists associated with the product scanners are displayed on the input/output unit of the sales device. Most items in a store that are taken from the shelves are scanned by the customers with their respective product scanners. These items are then not to be displayed. Only the items are displayed on the input/output device that were removed from the shelves and were not scanned by a customer with the product scanner. These are very few items. During normal operation, customers will scan most items and forget only a few. In this respect, the list of items remaining for a customer to select manually, in the event that the validation process has failed, is very manageable. This indicates an increased operating comfort and a reduced susceptibility to errors of the system.

In a validation method in self-checkout devices, detection methods are used to detect the items and check the list of scanned items. In particular, if it is determined that there are items that are not on the list of scanned items, ideally these items should be detected so that the user can be suggested the missing item right away. The method allows these items to be identified.

In one embodiment, the at least one sensor is at least one camera. In particular, this is at least one charge-coupled device (CCD) camera. In one embodiment, the data of the at least one sensor are image data. In one embodiment, the at least one sensor is a weighing cell. In one embodiment, the data of the at least one sensor is weight data.

In one embodiment, the step of validating the list of items associated with the product scanner includes:

Applying a method for object detection in the evaluation device. The method for object detection detects object-describing attributes in the data of the at least one sensor. These object-describing attributes are compared with object-describing attributes of items that are on the list of items intended for payment. This has the advantage that the object detection method only allows solutions as possible solutions, e.g., can only detect items, that have been removed from a shelf. Consequently, these items still have to be paid. While items that have not been removed from the shelf are still available in the assortment of the store, currently there should be no payment transaction for these items. Therefore, these items also cannot be recognized in the data of the sensor by the method for object detection. In one embodiment, the method for object detection is an optical method and is applied to image data of a shopping basket or shopping cart. In one embodiment, the optical method is based on edge detection, transformations, sizes and/or color detection.

In one embodiment, at least one shelf with automatic removal monitoring for detecting the removed article performs the following steps:

Receiving a signal from at least two, preferably three or four, weighing cells, which are arranged in the corners of a rigid body which forms a display area with at least two product areas. This means that the display area of a shelf is supported on a plurality of weighing cells. The weighing cells determine the weight force of the display area and the items which stand on the display area. The signals of the weighing cells correspond to the weight forces in the area of the corners of the rigid body.

Determining coordinates of the center of gravity and a total weight force from the received signals. These are determined by an evaluation unit from the signals of the weighing cells.

Receiving a signal corresponding to a new weight force from at least one weighing cell and determining new coordinates of the center of gravity with the evaluation unit from the data currently received from the weighing cells.

Determining a product area and a weight of the items removed from the product area.

Determining the item data of the item removed from the shelf on the basis of the determined product area and determining the number of removed items on the basis of the weight removed from the product area and the specific weight of the item.

In one embodiment, the display area is formed by a shelf compartment base, for example by a shelf board or a grid board of a shelf compartment.

The area on a rigid body from which an item has been removed can be determined using the coordinates of the center of gravity. For shelving, it is often the case that a rigid shelf base is supported by a frame. Several compartments are provided on the shelf base for various items. With the aid of a plurality of weighing cells, which are preferably attached to the corners of the rigid body, the area on the rigid body and thus the product area and thus also an associated item can be determined by determining the coordinates of the center of gravity. The total weight of the removed items can be used to determine the number of items removed from the product area.

In one embodiment, the evaluation unit determines a vector between the previous coordinates of the center of gravity and the new coordinates of the center of gravity when the total weight changes. The shelf area determined by a control device is determined from the vector and the total weight by the control device.

In one embodiment, the evaluation unit tares all weighing devices periodically and simultaneously. The coordinates of the center of gravity formed from the data of the weighing devices represent the center of gravity at which something was removed from or added to the shelf compartment base. In one embodiment, the evaluation unit for determining the new coordinates of the center of gravity forms the difference between a new weight value and a previous weight value for each weighing device. This means that when a product is removed from the shelf compartment base, the weight change at each weighing device is determined separately. The new coordinates of the center of gravity are determined from the four difference values, i.e., from the change in weight at each weighing device. Both embodiments result in the measured weight values of the four weighing devices being considered separately and in that no vector is calculated that has to be scaled. Thus, these two embodiments are less sensitive to tolerances in the determination of the weight value by the weighing devices.

In one embodiment, the method includes:

In the event that the items could be validated in the validation step, determining a total price for a payment transaction from the sum of all individual prices of the items that are on the list of items associated with product scanner.

Executing a payment transaction via a mobile payment method, a debit card or credit card, or via a cash payment transaction.

According to one or more embodiments of the invention, a sales device for self-checkout of goods in a store, in particular in a supermarket, is provided. The store comprises at least one shelf with automatic removal monitoring and a network for exchanging data. The sales device comprises a control device for controlling the sales device and a communication unit for receiving data from the network and a database for storing item data and object-describing attributes associated with the items. The control device is designed to receive item data of removed items from the at least one shelf with automatic removal monitoring via the network. The control device is designed to determine therefrom a list of the items to be paid. The control device is designed to receive item numbers from the at least one product scanner via the network. The control device determines therefrom a list of items associated with the product scanner. The sales device has a device for identifying the product scanner. The sales device comprises at least one sensor for collecting data about items in a shopping cart or in a shopping basket which is located on a support plate of the sales device. The sales device comprises an evaluation device which validates a list of items associated with the product scanner based on the data of the sensor and the list of items intended for payment.

In one embodiment, the evaluation device recognizes object-describing attributes from the data of the at least one sensor. These object-describing attributes are compared with object-describing attributes of items that are on the list of the items associated with the product scanner.

In one embodiment, the sales device is a part of a group of a plurality of sales devices in the store. The database is a common database for all sales devices of the group of the plurality of sales devices. The sales devices are connected to the database via a network.

In one embodiment, at least parts of the control device, the evaluation device and/or the database are located outside the store, in particular on a server or in a cloud network. The sales device accesses these parts of the control device, the evaluation device, and/or the database via a network.

In one embodiment, the method for operating the sales device includes the step of:

Resetting, at a time, especially when opening the store in the morning of the list of items intended for payment.

This means that at this point in time, all items that are intended for payment but have not yet been paid are deleted from the list. This can be, for example, shortly before opening the store in the morning. On the other hand, an employee can, for example, manually select this point in time and manually delete the list if they notice that there are no customers in the store. For example, at a time when there is no customer in the store, no items may be noted on the list of items intended for payment. If there are still items on the list, an error has occurred during the sales process. Either the items were not correctly billed during the payment transaction, the customer removed an item from the shelf and placed it at another location in the store, or the removal of the item from the shelf with automatic removal monitoring was incorrectly detected. Deleting the list is similar to a reset of the system so that the erroneous entries do not accumulate on the list over time and impair the performance of the system. The information on how many items need to be deleted from the list of items intended for payment also reflects how many items have been taken without permission, for example, due to theft.

Some exemplary embodiments of the invention are shown by way of example in the drawings and are described in the following.

FIG. 1 shows a system for self-checkout in a store. In a store, a plurality of customers 61 are present who themselves become operators during self-checkout at the sales devices 10, 40. The customers 61 go with a shopping cart 11 or a shopping basket 41 to the shelves 60 in order to take products and put them in their shopping cart 11 or shopping basket 41. While doing so, the customers 61 scan the items they take out of the shelves using a product scanner 62. The product scanner is, for example, a smartphone with a corresponding application (app). The smartphone identifies, with the camera, a barcode that is located on the items. This is the item number. The smartphone is connected via a wireless network, for example a mobile radio network or a wireless local area network (WLAN), to a computing cloud 63 in which a control device 64 is located. The control device receives the item number from the product scanner 62.

Figure 2:
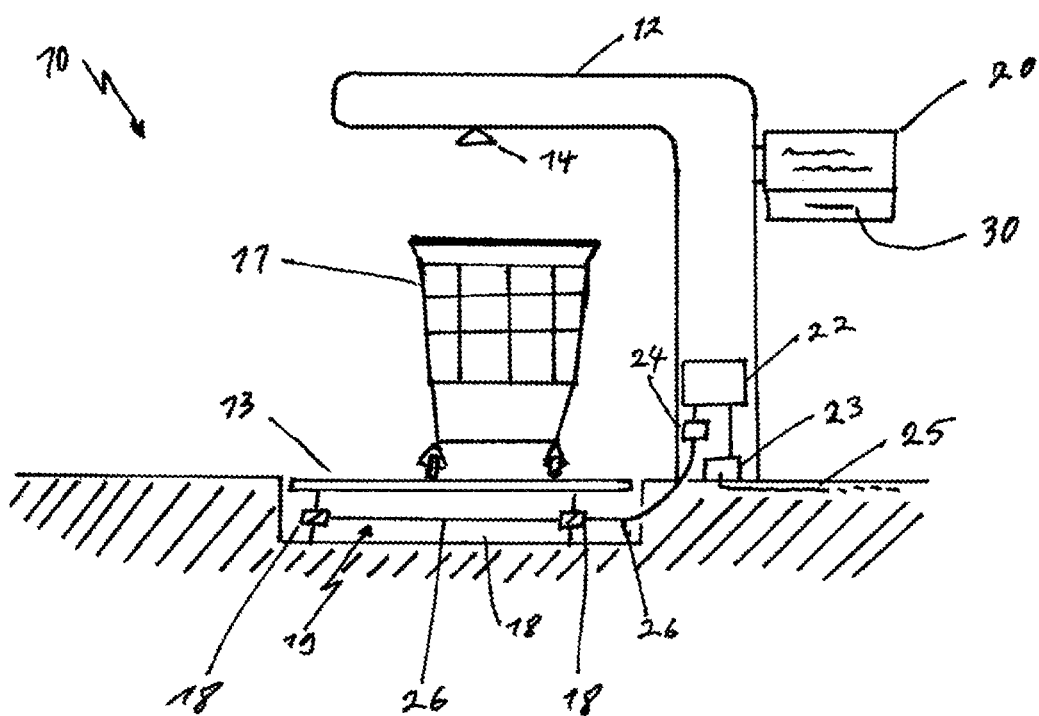
FIG. 2 a sales device in a first embodiment.

The store comprises one or more sales devices 10 suitable for self-checkout with a shopping cart 11, shown in detail in FIG. 2.

Figure 3:
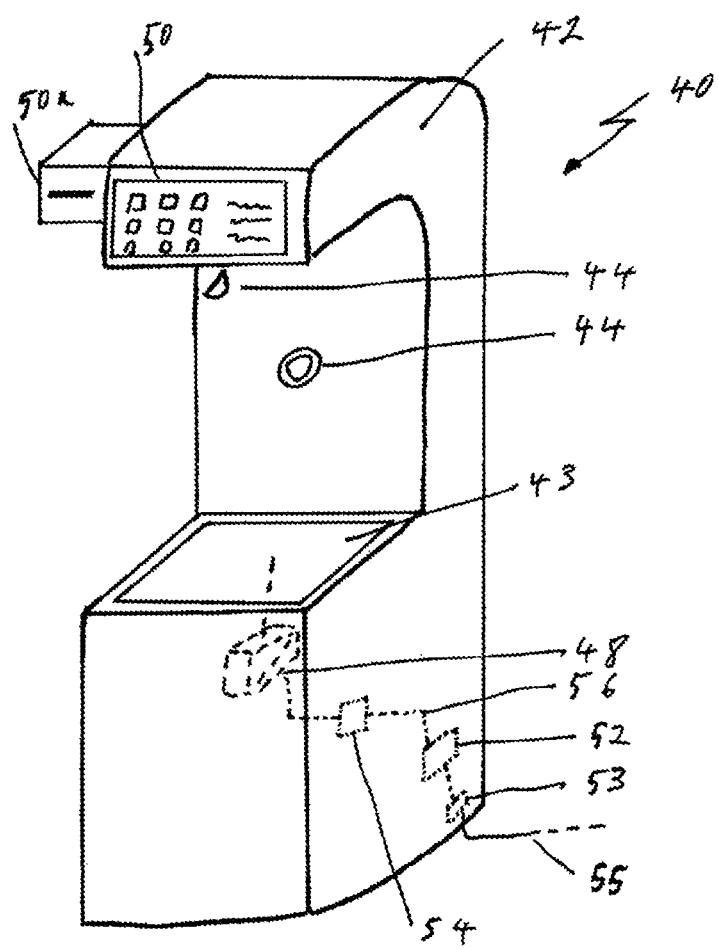
FIG. 3 a sales device in a second embodiment.

The store alternatively or additionally comprises one or more sales devices 40 that are suitable for self-checkout with a shopping basket 41, shown in detail in FIG. 3.

The sales devices 10, 40 are connected to the computing cloud 63 via a network 25, 55. The computing cloud 63 comprises a control device 64 that receives images and weight values of a shopping cart 11 or a shopping basket 41 from the sales device 10, 40 via the network 25, 55. The shelves 60 are equipped with automatic removal monitoring, the function of which is described in detail with reference to the drawings of FIG. 4 to FIG. 9.

If a customer removes a product from the shelf, the shelf transmits uses a communication device 66 to transmit the item data and the number of removed items to the computing cloud 63. Communication takes place, for example, via a wireless network 65 (as indicated in FIG. 1), in particular a public mobile network or a WLAN of the store, or a wired network (not shown in FIG. 1), in particular a local area network (LAN). In one embodiment, the computing cloud 63 comprises a control device 64. In one embodiment, the network 63 is a computing cloud, i.e., a cloud network in which the function of the control device 64 is implemented. In one embodiment, instead of the computing cloud 63, a network is provided which is provided exclusively for data transmission and the control device is provided in one or all of the sales devices 10, 40. In one embodiment, the control device 64 is a server in a network 25, 55, 66, 63, 65, wherein the network 25, 55, 66, 63, 65 connects servers 64, shelves 60 and sales devices 10, 40.

FIG. 2 shows a sales device 10 in a first embodiment. The sales device 10 comprises a frame 12 beneath which a shopping cart 11 can be pushed. Beneath the frame 12, the shopping cart 11 has a defined position (rest position) on a support plate 13. The support plate 13 is a load plate of scales and is mechanically connected to the force introduction side of one or more weighing cells 18. The scales determine the total weight of the shopping cart 11 with its contents. The frame 12 further comprises at least one camera 14 that is designed to create at least one image of a view of an open side of the shopping cart 11. Given a shopping cart 11, the top side is normally open. However, an open side in the sense of this disclosure is also, for example, a side part of the shopping cart which consists of transparent material. Within the scope of the invention, it shall also be deemed an open side if the shopping cart consists of a wide-meshed metal grid through which an image capture of the content of the shopping cart can be made. Within the scope of this disclosure, it is not to be deemed an open side if the side of a shopping cart consists of non-transparent plastic or is concealed by a non-transparent advertising panel.

The at least one weighing cell 18, in particular four weighing cells 18, is connected to a weight value processing device 24 that determines a weight value of the shopping cart 11 from the signals from the weighing cell 18 or weighing cells 18. The weight value processing device 24 includes a weight value memory for storing the weight value. The at least one camera 14 and the weight value processing device 24 are connected to a controller 22 and transmit the determined data to the controller 22. The controller 22 is connected to a communication device 23, through which the controller 22 communicates data such as images and weight to a network 25 and receives at least a retail price and a listing of items in the shopping cart 11 from the network 25. The sales device comprises an input/output unit 20 with which an operator can interact with the sales device 10. The input/output unit 20 also comprises a payment unit 30 at which preferably cashless payment can be made. The input/output unit 20 displays the data received from the network 25, in particular the items in the shopping cart 11 and their price, and directs the operator through a payment transaction with the payment unit 30.

After payment of the items, the input/output unit 20 outputs to the operator a corresponding notification that they can leave the store with their purchases. Optionally, the input/output unit 20 comprises a printer to print a receipt of the completed purchase for the operator.

After the operator has paid for the items in the shopping cart 11, the controller 22 sends a message via the network that these items have been paid for. This message is used in the control device 64 located on the network 63 to remove the paid items from the list of items intended for payment, as will be explained in more detail below. It is also used to advise to delete the list of the items associated with the product scanner 62 in the control device.

FIG. 3 shows a sales device 40 in a second embodiment. This embodiment is suitable for detecting and accounting for the contents of a shopping basket 41. A frame 42 is designed in such a way that it forms a support for the shopping basket 41, such support is not located down on the floor but rather at an ergonomic height for the operator. The frame 42 comprises an upper part which projects over the parked shopping basket 41. In the frame, a support plate 43 is formed on which the shopping basket 41 an be placed with its underside. The frame 42 holds at least one camera 44 which is positioned such that it can make an image of the content of the shopping basket 41 from an open side of the shopping basket 41.

The sales device 40 includes scales. A support plate 43 forms the load plate of the scales and is mechanically connected to the force introduction side of a weighing cell 48 accommodated in the frame 42. The weighing cell 48 is connected to a weight value processing device 54 which determines a weight value of the shopping basket 41 from the signals of the weighing cell 48 and stores said weight value in a weight value memory. In this embodiment as well, the support plate 43 can be supported by a plurality of weighing cells 48. Since a shopping basket 41 is not as heavy and not as large as a shopping cart 11 and the support plate 43 is correspondingly smaller in design than in the first embodiment, in a preferred embodiment one weighing cell 48 is sufficient for weight determination. The weight value processing device 54 passes the weight value to a controller 52, which for its part is connected to a communication device 53. The controller 52 controls the processes in the sales device 40. The communication device 53 is connected to a network 55. The sequences predetermined by the controller 52 and the data transmitted by the communication device 53 via the network 55 are analogous to the first exemplary embodiment. The upper part of the frame 42 comprises an input/output unit 50. The input/output unit 50 can be integrated into the housing of the frame 42 and is a touchscreen, for example. A payment unit 50a is mounted on the frame. The payment unit 50a can also be integrated into the input/output unit 50. The payment unit 50a serves for cashless payment at the sales device 40.

Figure 4:
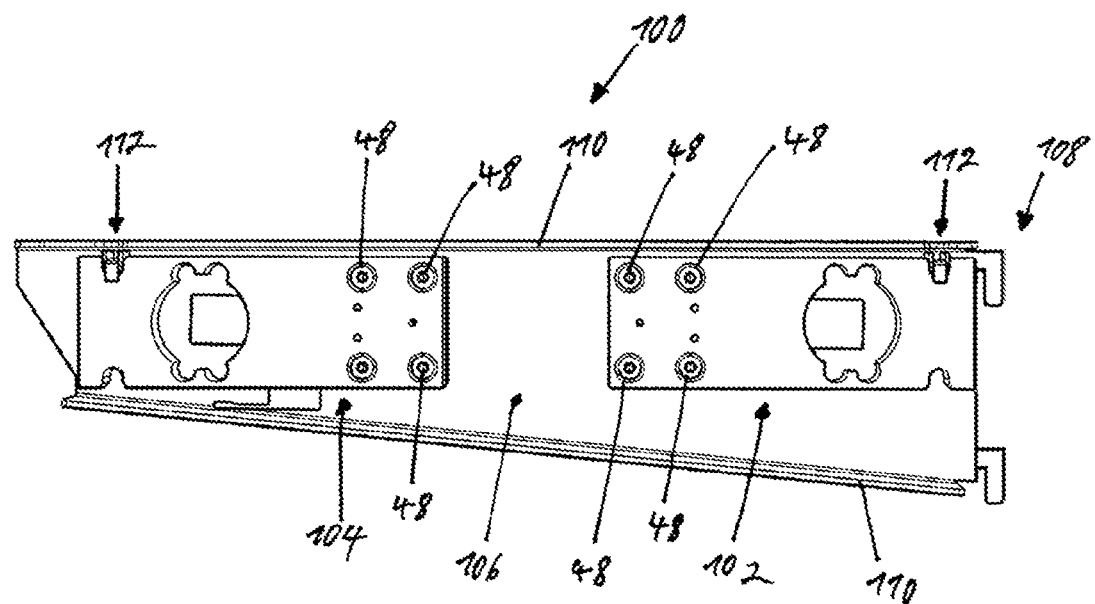
FIG. 4 a shelf console with two weighing devices.

FIG. 4 shows a side view of the inside of a shelf console 100. The shelf console 100 consists of a cantilever 106 extending in the horizontal direction, which is formed from a vertically arranged sheet metal. In order to increase stability, the cantilever 106 has a stiffening rib 110 on its upper side and on its underside. The stiffening rib is realized by a bending of the metal sheet by 90°. At an axial end of the cantilever 106, the shelf console 100 comprises an anchoring device 108 in the form of two hooks by means of which the shelf console can be fastened in a shelf rail. Shelf rails are often designed as vertically attached rails with slots arranged one above the other so that the shelf consoles can be fastened to the shelf rail at various heights. Two shelf consoles 100 attached to two spaced shelf rails at the same height support a shelf compartment base and thus form a shelf compartment. The cantilever 106 is triangular in shape, that is to say, in the area of the anchoring device 108, the height of the cantilever is greater than at the opposite axial end corresponding to the front area of the shelf compartment. The cantilever further comprises two weighing devices 102, 104, wherein a weighing device 102 is attached in the area of the anchoring device 108 and a weighing device 104 is attached in the area of the other axial end of the cantilever 106. The weighing devices 102, 104 are fastened to the cantilever 106 with screws 48. Each weighing device 102, 104 comprises a force introduction section 112 with a receiving element having a receptacle. A strut of a shelf compartment base may be introduced into the receptacle so that the force introduction sections of the weighing devices 102, 104 support and hold the shelf compartment base via its struts. In this case, the receiving element is freely accessible from above, so that the shelf compartment base is supported exclusively via the force introduction sections 112 of the weighing devices 102, 104. Each weighing device 102, 104 is associated with a circuit board with electronics arranged thereon, in particular an analog-digital converter, for processing at least one output signal of a strain gauge of the weighing devices 102, 104. The weight of the shelf compartment base as well as the items deposited on the shelf compartment base is measured by the weighing devices 102, 104. The weight values, and in particular the change in the weight values of the four weighing devices 102, 104, are used to calculate at which location on the shelf an article is removed, as shown in the description with reference to FIG. 6. In this way, the removed item can be identified. This corresponds to a removal monitoring of the shelf.

FIG. 4 shows a shelf console 100 which, when viewed from the front, forms the left shelf console of a shelf compartment. A shelf compartment must also comprise a right shelf console, so that the shelf compartment base is supported on the left side by the left shelf console and on the right side by the right shelf console. Left shelf console, right shelf console, and shelf compartment base together form a shelf compartment on which items can be placed and removed. The right shelf console is not shown. The right shelf console is constructed mirror-symmetrically to the left shelf console.

Figure 5:
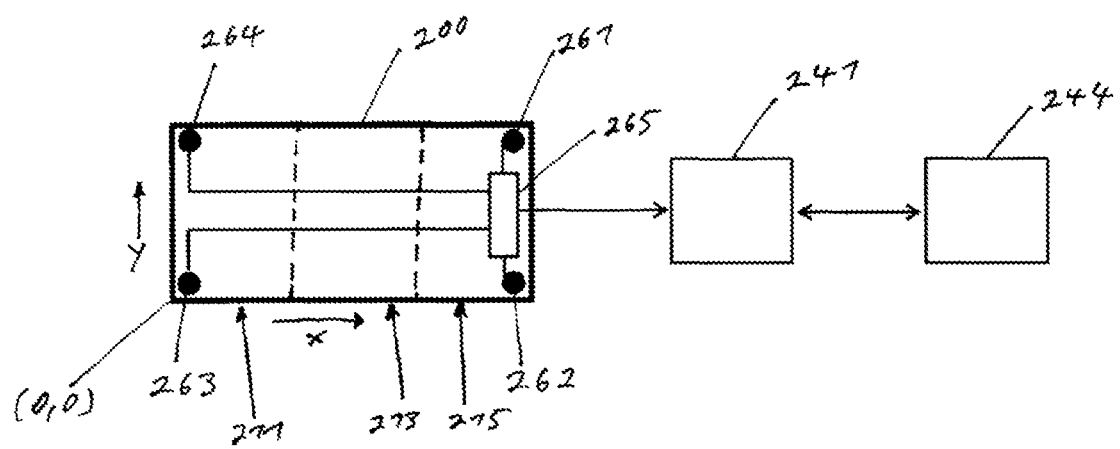
FIG. 5 a block diagram of a shelf.

FIG. 5 schematically shows three shelf areas 211, 213, 215 on a shelf compartment base 200 and corresponding components for removal monitoring. The shelf area 211, 213, 215 from which a product has been removed from the shelf compartment base 200 is determined by determining the center of gravity of the shelf compartment base 200.

The shelf compartment base 200 is suspended by the four weighing devices 261, 262, 263, 264. These are the weighing devices 102, 104, which are integrated into the shelf consoles 100. A shelf console 100 to the left of the shelf compartment base 200 and a shelf console 100 to the right of the shelf compartment base 200 support the shelf compartment base 200. The force introduction sections of the weighing devices 261, 262, 263, 264 support the shelf compartment base 200 at the ends of its struts. The weighing devices 261, 262, 263, 264 independently determine an effective weight force created by the shelf compartment base 200 and the articles deposited in the shelf areas 211, 213, 215. In this case, a single weight force acts on each weighing device 261, 262, 263, 264 in proportion to the total weight. The data from the weighing devices 261, 262, 263, 264 are transmitted to an evaluation unit 265. The evaluation unit 265 determines coordinates of the center of gravity of the shelf compartment base 200 from the individual weight data of the weighing devices 261, 262, 263, 264. The coordinates in the shelf area 211, 213, 215 start at one corner of the weighing device 263 with the coordinates (0, 0) and extend in the horizontal direction X and in the vertical direction Y.

To illustrate the determination of the center of gravity, the weighing devices 261, 262, 263, 264 are assigned the corresponding weight data W261, W262, W263, W264, as shown in FIG. 5.

The formation of the center of gravity in the X direction is determined as follows:

$$(W261+W262)/(W261+W262+W263+W264)$$

The formation of the center of gravity in the Y direction is determined as follows:

$$(W261+W264)/(W261+W262+W263+W264)$$

Using a corresponding normalization factor that takes into account the size of the shelf compartment base 200, coordinates in the shelf area 211, 213, 215 corresponding to the coordinates of the center of gravity of the shelf compartment base 200 can be determined. These coordinates are determined in the evaluation unit 265 on the basis of the data of the weighing devices 261, 262, 263, 264. Furthermore, the evaluation unit 265 forms a total weight W261+W262+W263+W264. The coordinates of the center of gravity and the total weight are transmitted by the evaluation unit 265 to a control device 241. The shelf comprises a memory 244 in which a mapping between coordinates of the center of gravity and shelf areas 211, 213, 215 is stored. The memory 244 further stores, for each shelf area 211, 213, 215, the average weight of a piece of an item in that shelf area 211, 213, 215. With this arrangement, in addition to the shelf areas 211, 213, 215 shown in FIG. 5, which are arranged side by side in the X direction, it is also possible to determine shelf areas which are arranged in rows and columns in the X and Y directions, i.e., in a matrix.

Figure 6:
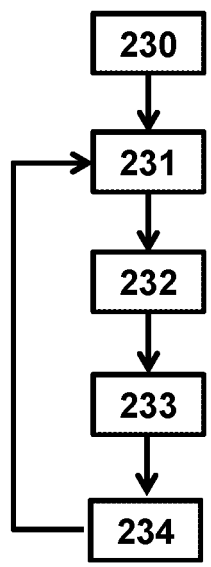
FIG. 6 a method for operating a shelf.

FIG. 6 shows a method for automatic removal monitoring in a shelf 60, which is executed by a control device 241.

In step 230, the shelf areas 211, 213, 215 of the shelf compartment base 200 are populated with items. In this process, memory 244 is used to assign items to each shelf area 211, 213, 215 and to store a weight per item. Furthermore, the X and Y coordinates of each shelf area 211, 213, 215 are stored in the memory 244. These coordinates do not have to be restored with each filling, since they do not change. However, if the size of the shelf areas 211, 213, 215 and their arrangement is changed by rearranging the partitions, the mapping between X and Y coordinates and shelf areas 211, 213, 215 must be updated in memory 244. It is thus stored in the memory 244 over which X and Y coordinates each shelf area 211, 213, 215 extends.

In step 231, an evaluation unit 265 is used to determine from the weight values of the weighing devices 261, 262, 263, 264 a location where one or more items have been removed and to determine the total weight of the removed items. The determination in step 231 can be carried out using three alternative methods, which are described below with reference to FIG. 7 and FIG. 9.

In step 232, the control device 241 determines the assigned shelf area 211, 213, 215 on the basis of the coordinates of the location where something was removed and by means of the information from the memory 244 about the arrangement of the shelf area 211, 213, 215.

In step 233, the number of items removed from the shelf area 211, 213, 215 is determined from the determined total weight of removed items and the weight value for an item associated with the shelf area 211, 213, 215 in memory 244. Thus, the number of removed objects is determined.

In step 234, the information as to which items and how many items have been taken is sent to the computing cloud 63 using the communication device 66 of the shelf 60. The method is then continued with step 231 with the removal of another item.

Figure 7:
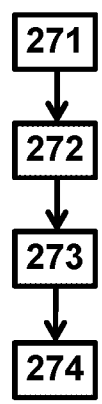
FIG. 7 a first method for determining a location on the shelf compartment base at which a product was removed or added.

FIG. 7 schematically shows a first method for determining a location on the shelf compartment base 200 where an item was removed.

In step 271, all the weighing devices 261, 262, 263, 264 are tared, that is, the shelf compartment base 200 and all items placed thereon are treated as if they were a preload for the weighing devices 261, 262, 263, 264 and set to zero.

In step 272, a new weight value is measured by at least one weighing device 261, 262, 263, 264 and received by the evaluation device 265.

In step 273, the evaluation device 265 calculates coordinates of the center of gravity on the basis of the current weight data of the weighing devices 261, 262, 263, 264. These coordinates of the center of gravity do not reflect the center of gravity of the shelf compartment base 200, but rather the center of gravity of the change in weight in the coordinate system of the shelf compartment base 200. This is the location at which an item was removed from the shelf compartment base 200.

In step 274, this location and the change in weight is passed on to the control device 241.

Figure 8:
FIG. 8 a second method for determining a location on the shelf compartment base at which a product was removed or added.

FIG. 8 schematically shows a second method for determining a location on the shelf compartment base 200 at which an item was removed.

In step 281, coordinates of the center of gravity of the current center of gravity of the shelf compartment base 200, including all the items placed thereon, are determined. This is the true center of gravity. The shelf compartment base 200 or at least the items placed thereon are not tared.

In step 282, a new weight value is measured by at least one weighing devices 261, 262, 263, 264 and received by the evaluation device 265.

In step 283, new coordinates of the center of gravity are determined by the evaluation device 265 from the new data of the weighing devices 261, 262, 263, 264.

In step 284, a vector reflecting the shift in the coordinates of the center of gravity is formed from the previous coordinates of the center of gravity and the new coordinates of the center of gravity. Starting from the previous center of gravity, the vector leads to the new center of gravity unless the vector is scaled.

Then, in step 285, the vector is scaled using the total weight of the shelf compartment base and the change in total weight.

The location at which a product was taken from the shelf compartment base 200 results in step 286 by adding the scaled vector to the previous coordinates of the center of gravity.

In step 287, this location and the change in weight is passed on to the control device 241.

Figure 9:
FIG. 9 a third method for determining a location on the shelf compartment base at which a product was removed or added.

FIG. 9 schematically shows a third method for determining a location on the shelf compartment base 200 where an item was removed.

In step 291, all weighing devices 261, 262, 263, 264 respectively determine a weight value, the preceding weight value.

In step 292, a new weight value is measured by at least one weighing device 261, 262, 263, 264 and received by the evaluation device 265.

In step 293, the evaluation unit 265 calculates the change in weight value separately for each weighing device 261, 262, 263, 264, i.e., the evaluation unit constitutes the difference between the new weight value and the preceding weight value.

In step 294, the evaluation device 265 calculates the coordinates of the center of gravity of the difference values of the four weighing devices 261, 262, 263, 264. These coordinates of the center of gravity do not reflect the center of gravity of the shelf compartment base 200, but rather the center of gravity of the change in weight in the coordinate system of the shelf compartment base 200. This is the location at which an item was removed from the shelf compartment base 200.

In step 295, this location and the change in weight is passed on to the control device 241.

Figure 10:
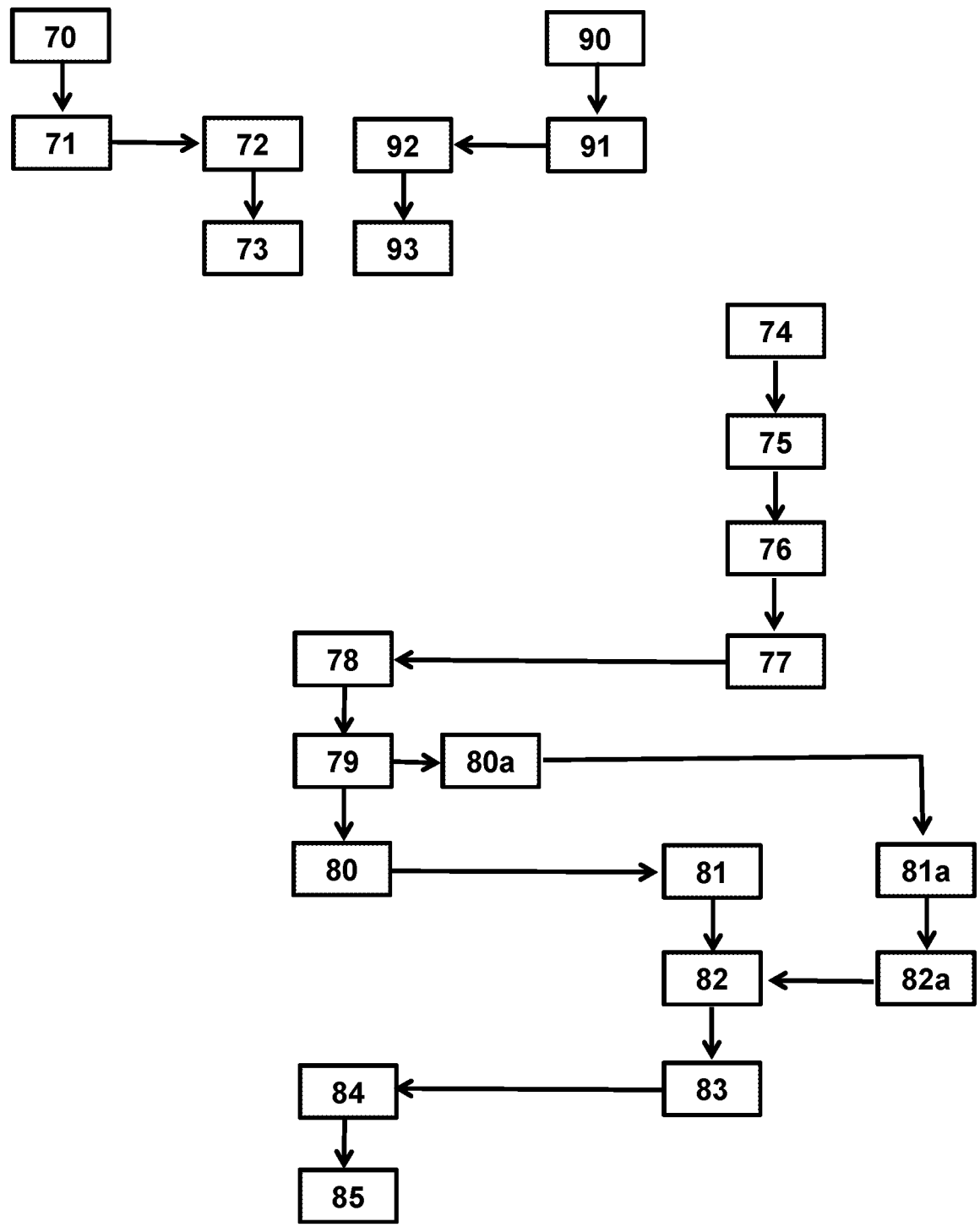
FIG. 10 a method for self-checkout in a store.

FIG. 10 schematically shows a method for self-checkout in a store. The method steps are carried out in part by a shelf 60 with automatic removal monitoring, in part by the customer with their product scanner 62, in part by a sales device 10, 40 and in part by a control device 64 in a computing cloud 63 or on a server in a network.

Steps 70, 71 are executed by the shelf 60 with automatic removal monitoring, while a customer walks through the store and collects the items for their purchase. At the same time, the customer scans the items with a product scanner 62. Steps 90, 91 are executed with the product scanner. The steps on the right-hand side in FIG. 10 are executed by the sales device 10, 40. The remaining steps in the middle of FIG. 10 are executed by the computing cloud 63 with a control device 64 or by a server which can also perform the function of a control device.

During self-checkout in a store, the customer is responsible for taking their purchases from the shelves 60 themselves, scanning them with the product scanner 62, and, to complete the purchase, paying for the products themselves at a sales device 10, 40 for self-checkout. The computing cloud is responsible for compiling the billing. The store can consequently do without the cashier staff. The customer replaces the cashier staff and is thus himself an operator of the self-checkout sales device 10, 40.

The customer takes a shopping cart 11 or shopping basket 41 and walks through the store with it and takes the desired items from the shelves 60. Meanwhile, the shelves 60 continuously and automatically monitor the removal of items by the customers. This takes place in a first step 70. This step is carried out by all shelves and for all customers. The shelves do not detect which customer removes something, but only that something has been removed. The removal monitoring and the detection of a removed item as well as the determination of its item data are carried out in accordance with the description with reference to FIG. 4 to FIG. 9. In step 71, the shelf 60 sends the item data of the removed items and their number to the computing cloud 63 via the communication device 66.

If the customer 61 removes an item from the shelf 60, they scan it with the product scanner in step 90 before placing the item into the shopping cart 11 or shopping basket 41. In step 91, the product scanner 62 sends the article information to the computing cloud 63.

In step 72, a control device 64 in the computing cloud 63 receives the item data and the number of removed items. In step 73, the control device 64 adds the item data and the number of removed items to a list of items intended for payment. These steps take place continuously for all shelves. In step 92, the control device 64 in the computing cloud 63 receives the item number of the removed item from the product scanner 62. In step 93, the control device adds the item number to a list of items associated with the product scanner 62. In one embodiment, additional item data are added to the list in addition to the item number, such as a brief description of the item, price, or other item data.

In step 74, the sales device 10, 40 detects the placement of a shopping cart 11 or shopping basket 41 on the support plate 13, 43 due to the change of a weight value measured with a weighing cell 18, 48 and an associated weight processing device 24, 54 and determines the weight of the shopping cart 11 or shopping basket 41 along with its contents. In this process, the empty weight of the shopping cart 41 or shopping basket 41 is subtracted from the measured weight so that only the weight of the items in the shopping cart 11 or shopping basket 41 is determined.

In step 75, the sales device 10, 40 and the product scanner 62 are synchronized. This may be achieved by direct synchronization via Bluetooth between sales device 10, 40 and product scanner 62. In one embodiment, a customer 61 scans with their product scanner 62 a QR code at the sales device 10, 40 so that the product scanner 62 itself performs the assignment to the sales device 10, 40. This is achieved by the product scanner 62 sending the scanned information, i.e., the identification of the sales device 10, 40 via the network to the computing cloud 63 and further processing this information in the control device 64 of the computing cloud 63. It is important that there may later be an association between the sensor data of the sales device 10, 40 and the corresponding list of scanned items of the product scanner 62 of the customer 61, who has placed their purchase together with the shopping cart 11 or shopping basket 41 on the sales device 10, 40.

In step 76, at least one image of an open side of the shopping cart 11 or shopping basket 41 is captured by the camera 14, 44 of the sales device 10, 40.

In step 77, the image data and weight data as well as optionally the information about the product scanner 62 are sent from the sales device 10, 40 to the computing cloud 63 via a network 25, 55. It is intended that the product scanner 62 continuously transmits the scanned data about the items to the computing cloud 63 in step 91 so that only the corresponding identification of the product scanner has to be transmitted in step 77. In contrast, in one embodiment, it is intended that the product scanner 62 stores all items locally and then, in step 77, the list of items associated with the product scanner 62 is transmitted indirectly via the sales device 10, 40 or directly via the communication device 65, 66 from the product scanner 62 to the computing cloud 63.

In step 78, the computing cloud 63 receives the image data and weight data from the sales device 10, 40. Furthermore, in step 78, the computing cloud 63 receives the information to which product scanner 62 the received image data and weight data belong.

The control device 64 of the computing cloud 63 comprises an evaluation device which, on the basis of the weight data and the image data in step 79, compares all items which are in the relevant shopping cart 11 or shopping basket 41 with the list of the items associated with the product scanner 62. This involves validating the contents of the shopping cart 11 or shopping basket 41, i.e., using the weight data and the image data to check whether the list of the items associated with the product scanner 62 includes all the items that are actually in the shopping cart 11 or shopping basket 41. In this process, the evaluation device uses the image data as a basis and performs an object detection method. The evaluation device only allows solutions in which a set of items is detected whose summed individual weights correspond to the measured weight of the items in the shopping cart 11 or shopping basket 41 transmitted from the sales device 10, 40.

The person skilled in the art is aware that the method for object detection is performed on the basis of probability calculation and that the weight data serve to increase the probability in favor of one or the other solution in the evaluation device. In the event that the validation has been completed and the items on the list associated with the product scanner match the image data and weight data of the sales device 10, 40, the computing cloud 63 sends a release signal to the sales device 10, 40 in step 80. In one embodiment 10, 40, further information regarding the items, such as item name and price or the content of a receipt, is sent to the computing cloud 63.

In step 81, the sales device 10, 40 receives the release signal from the computing cloud 63. In step 82, the sales device 10, 40 starts the payment transaction with the customer via the input/output unit 20, 50 and the payment unit 30, 50a. Once the customer has paid for the items, they can leave the store. In step 83, the sales device 10, 40 then sends a confirmation to the computing cloud 63. In step 84, the computing cloud 63 receives the confirmation about the payment transaction of the items and, in step 85, deletes the paid items with the control device from the list of items to be paid. In addition, the list of the items associated with the product scanner 62 is deleted.

If there are items in the shopping cart 11 or shopping basket 41 that have not been scanned, no validation takes place in step 79 because the control device determines a discrepancy between the list of items associated with the product scanner and the image data and weight data received in step 78. In this case, in step 80a, the computing cloud 63 sends the list of items intended for payment or a part thereof to the sales device 10, 40. In one embodiment, the part of the list of items intended for payment that is sent to the sales device 10, 40 comprises only items that are not associated with a product scanner. Only for these items it is so far unclear in which shopping cart 11 or shopping basket 41 they are located. In one embodiment, the part of the list of items intended for payment that is sent to the sales device 10, 40 comprises only items that are not associated with a product scanner and that additionally, based on an object detection process based on the image data and weight data, are highly likely to be located in the shopping cart 11 or shopping basket 41 that is currently placed on the support plate 13, 43. In step 81a, the sales device 10, 40 receives the items which were sent in step 80*a* from the computing cloud 63 and displays them to the customer in the input/output unit 30, 50.

In step 82*a*, the customer can select the missing items via the input/output unit 30, 50 from the displayed list and add them to the list of their purchases. In one embodiment, further validation is provided in the computing cloud 63. In step 82, the customer pays for their purchase, and the method is concluded with steps 83 to 85 as described above.

The functions of various elements shown in the drawings, including the functional blocks, may be realized by dedicated hardware or by generic hardware capable of executing software in conjunction with the corresponding software. If the functions are provided by means of a processor, they may be provided by a single dedicated processor, a single shared processor, or a plurality of generic processors which may in turn be shared. The functions may be provided, without limitation, by a digital signal processor (DSP), network processor, application-specific integrated circuit (ASIC), field programmable gate array (FPGA), read-only memory (ROM) with stored software, random access memory (RAM), and nonvolatile memories.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A method for sales-operator-free operating of a sales device for goods, the method comprising:
   a shelf with automatic removal monitoring, the shelf comprising a communication device and at least two weighing cells supporting a rigid body forming a display area, the weighing cells providing signals corresponding to weight forces at areas of the rigid body, the shelf automatically detecting removed items, determining item data of the removed items, and sending, via the communication device, the item data of the removed items and a number of the removed items to a computing cloud;
   receiving, by a controller of the computing cloud, the item data of the removed items;
   adding, with the controller of the computing cloud, the item data of the removed items to a list of items intended for payment, the list of items intended for payment comprising items that have already been removed from shelves but have not been paid for, the shelves comprising the shelf with automatic removal monitoring;
   receiving, by the controller, an item number from a product scanner;
   adding, with the controller, a scanned item associated with the item number to a scanned list associated with the product scanner, the scanned list associated with the product scanner comprising scanned items that were placed in a shopping cart or a shopping basket during a present purchase and that require payment;
   identifying the product scanner at the sales device;
   collecting, with at least one sensor, data about present items in the shopping cart or the shopping basket when the shopping cart or shopping basket is located on a support plate of the sales device; and
   in a validating step, validating, with the computing cloud, that each item of the scanned list of items associated with the product scanner is in the shopping cart or shopping basket on a basis of:
   the data collected from the at least one sensor; and
   the list of items intended for payment,
   wherein in the validating step, the validating comprises:
      confirming that the data collected from the at least one sensor correspond to the scanned list of items associated with the product scanner, and
      confirming that each item on the scanned list of items associated with the product scanner is on the list of items intended for payment that comprise the items that have already been removed from the shelves but have not yet been paid for,
   wherein the method further comprise removing the items from the list of items that are intended for payment based upon the items being included in a concluded payment transaction.

2. The method for operating the sales device according to claim 1, wherein the at least one sensor is at least one camera, and the data collected from the at least one sensor are image data, or wherein the at least one sensor is at least one sales device weighing cell and the data collected from the at least one sensor are weight data.

3. The method for operating the sales device according to claim 1, wherein the step of validating the scanned list of items associated with the product scanner comprises:
   executing a method for object detection, wherein the method for object detection comprises detecting object-describing attributes in the data collected from the at least one sensor and comparing the object-describing attributes in the data collected from the at least one sensor with object-describing attributes of the items that are on the list of items intended for payment.

4. The method for operating the sales device according to claim 1, wherein the method comprises the at least one shelf with automatic removal monitoring for detecting the removed item performing the following:
   obtaining the signals from the at least two weighing cells, which are arranged in corners of the rigid body forming the display area with at least two product areas, the signals corresponding to the weight forces in each area of the corners of the rigid body;
   determining coordinates of the center of gravity and a total weight force from the signals;

obtaining a new signal corresponding to a new weight force of at least one of the weighing cells, and determining new coordinates of the new center of gravity from data currently received by the weighing cells;

determining a product area, of the product areas, and a weight of the removed items from the determined product area; and determining the item data of the removed items on the basis of the determined product area, and determining the number of the removed items on the basis of the weight removed from the determined product area and a specific weight of one or more of the removed items.

5. The method for operating the sales device according to claim 4, the method comprising, upon determining that the total weight changes, determining a vector between the previous coordinates of the center of gravity and the new coordinates of the center of gravity, and determining the shelf area from the vector and the total weight.

6. The method for operating the sales device according to claim 4, wherein all of the weighing cells are tared periodically and simultaneously.

7. The method for operating the sales device according to claim 4, wherein the difference between a new weight value and a previous weight value is formed for each of the weighing cells to determine the new coordinates of the new center of gravity, and the new coordinates of the new center of gravity are determined from four difference values.

8. The method for operating the sales device according to claim 3, wherein the method for object detection is an optical method and is based on edge detection, transformations, sizes, or color detection.

9. The method for operating the sales device according to claim 3, wherein the method for object detection is a method which compares a measured weight value with the weight of at least one item on the list of items intended for payment.

10. The method for operating the sales device according to claim 1, the method comprising:

in a case that the scanned list of items are successfully validated in the validation step, determining a total price for a payment transaction from a sum of all individual prices of the items that are on the scanned list of items associated with the product scanner, and executing the payment transaction via a mobile payment method, a debit card or credit card, or via a cash payment transaction.

11. The method for operating the sales device according to claim 1, the method comprising:

in a case that one or more of the scanned list of items are not successfully validated in the validation step, displaying at least a part of the scanned list of items intended for payment on an input/output unit of the sales device; and receiving further items intended for a payment transaction via those of the input/output unit.

12. The method for operating the sales device according to claim 11, wherein upon displaying a portion of the list of the items intended for payment on an input/output unit of the sales device, only the items or a portion of the items that are not on one of a plurality of lists associated with product scanners, which comprise the list associated with the product scanner, are displayed.

* * * * *